(12) United States Patent
Mecl et al.

(10) Patent No.: US 11,680,854 B2
(45) Date of Patent: Jun. 20, 2023

(54) MULTIPOINT SURFACE TEMPERATURE MEASUREMENT SYSTEM AND METHOD THEREOF

(71) Applicant: ACCELOVANT TECHNOLOGIES CORPORATION, North Vancouver (CA)

(72) Inventors: Ondrej Mecl, North Vancouver (CA); Noah John Joe Johnson, North Vancouver (CA)

(73) Assignee: ACCELOVANT TECHNOLOGIES CORPORATION, North Vancouver (CA)

( * ) Notice: Subject to any disclaimer, the term of this patent is extended or adjusted under 35 U.S.C. 154(b) by 0 days.

(21) Appl. No.: 17/742,286

(22) Filed: May 11, 2022

(65) Prior Publication Data

US 2023/0129126 A1    Apr. 27, 2023

Related U.S. Application Data

(62) Division of application No. 17/508,087, filed on Oct. 22, 2021, now Pat. No. 11,359,976.

(51) Int. Cl.
*G01K 11/00* (2006.01)
*G01K 11/32* (2021.01)
(Continued)

(52) U.S. Cl.
CPC .............. *G01K 11/32* (2013.01); *G01K 1/143* (2013.01); *H04N 5/33* (2013.01)

(58) Field of Classification Search
CPC .. G02B 6/02042; G02B 6/03633; G02B 1/00; G02B 5/00; G02B 9/00; G02B 26/00; G02B 27/00; G02B 30/00; G02B 21/00; G01K 11/3213; G01K 11/20; G01K 1/08; G01K 13/02; G01K 13/08; G01K 15/005; G01K 1/143; G01K 17/20; G01K 2213/00; G01K 17/00; G01K 11/32; G01K 3/00;
(Continued)

(56) References Cited

U.S. PATENT DOCUMENTS 4,797,555 A * 1/1989 La Mar ................. G01J 1/4257
374/161
5,775,808 A * 7/1998 Pan .................... G01K 11/3213
374/161
(Continued)

FOREIGN PATENT DOCUMENTS

EP        0873003 A1 * 10/1998
JP        H0926484 A  *  1/1997
(Continued)

*Primary Examiner* — Gail Kaplan Verbitsky (57) ABSTRACT

Examples of a fiber optic temperature measuring system for measuring a temperature of a surface at multiple points simultaneously in real time is provided. The fiber optic temperature measuring system comprises a fiber optic probe with fiber bundle with plurality of individual fibers with thermographic phosphor at the fiber's tip and a high-speed camera. Invention allows accurate multipoint measurement of ESC' surface temperature. The thermographic phosphor is embedded in a nudge at the tip of each individual fibers or on the surface (under the surface) at predetermined positions.

5 Claims, 5 Drawing Sheets

(51) Int. Cl.
*H04N 5/33* (2023.01)
*G01K 1/143* (2021.01)

(58) Field of Classification Search
CPC ... G01K 1/00; G01K 13/00; G01J 3/10; G01J 3/32; G01J 3/36; G01J 1/00; G01J 5/00
See application file for complete search history.

(56) References Cited

U.S. PATENT DOCUMENTS

| | | | | |
|---|---|---|---|---|
| 6,538,735 | B1 * | 3/2003 | Duebendorfer | G01N 21/6452 356/318 |
| 8,201,997 | B1 * | 6/2012 | Salour | A61B 1/00097 374/161 |
| 10,996,117 | B1 * | 5/2021 | Mecl | G01D 5/268 |
| 2004/0188602 | A1 * | 9/2004 | Chinn | G01N 21/171 850/10 |
| 2007/0189359 | A1 * | 8/2007 | Chen | B82Y 30/00 374/161 |
| 2009/0296778 | A1 * | 12/2009 | Kinugasa | G01K 11/3213 374/161 |
| 2015/0276506 | A1 * | 10/2015 | Djeu | G01K 11/32 374/161 |
| 2018/0306988 | A1 * | 10/2018 | Clopp | G02B 6/3644 |
| 2021/0284904 | A1 * | 9/2021 | Johnson | C09K 11/7777 |

FOREIGN PATENT DOCUMENTS

| | | | | |
|---|---|---|---|---|
| JP | 4704532 B2 * | 6/2011 | | B01J 19/0006 |
| WO | WO-2004047609 A2 * | 6/2004 | | A61B 5/0059 |
| WO | WO-2006125162 A2 * | 11/2006 | | G01N 21/171 |
| WO | WO-2012049831 A1 * | 4/2012 | | G01B 11/24 |

* cited by examiner

MULTIPOINT SURFACE TEMPERATURE MEASUREMENT SYSTEM AND METHOD THEREOF

CROSS REFERENCE TO RELATED APPLICATIONS

This application is a division of U.S. application Ser. No. 17/508,087 filed Oct. 22, 2021, which claims priority from a provisional application No. 63/105,060 filed Oct. 23, 2023.

TECHNICAL FIELD

The present disclosure generally relates to a system for measuring temperature of a surface at multiple points along such surface and more specifically to a phosphor thermometry system using fiber optic bundle and a high-speed camera.

BACKGROUND

Unless otherwise indicated herein, the materials described in this section are not prior art to the claims in this application and are not admitted to be prior art by inclusion in this section.

Fiber optic temperature sensors such as phosphor thermometer is a device that uses luminescence emitted from the phosphor to determine a temperature of an object. Typically, thermographic phosphors when excited with a light within a certain wavelength emit a light within a different wavelength. Certain characteristics of the emitted light change with temperature including brightness, color, and afterglow duration. The response of the emitted light to temperature is monitored by various methods, such as analyzing the change in emission intensity at a single wavelength or the change in intensity ratio of two or more wavelengths, lifetime decay, and shift in emission wavelength peak. Phosphor used for measuring the temperature of an object is either coated directly to the surface or placed within a probe and brought in contact with the surface, which is then illuminated with a light source and the temperature of the object is determined based on the response of the emitted light.

Wafer temperature, such as uniformity of the wafer surface temperature during the semiconductor process (Etch, PECVD, ALD) has a significant effect on wafer process yield and therefore on semiconductor process performance. However, it is very difficult to determine the wafer temperature in situ and in real time because the wafer is enclosed in a reaction chamber during processing. Electrostatic chuck (ESC) is used to hold the wafer during processing. ESC employs a platen with integral electrodes which are biased with high voltage to establish an electrostatic holding force between the platen and wafer, thereby "chucking" the wafer. This create strong radio frequency (RF) fields in the processing chamber which prohibit using thermocouples or platinum resistance thermometers (PRTs) for accurate temperature measurement ESC chuck or any process equipment in its proximity. Currently these challenges are overcome by use of fiber optic temperature sensors utilizing thermographic phosphors. However, fiber optic temperature sensors provide single point temperature measurements with limited number of sensors allowed on the ESC surface to prevent adverse effects on uniformity of the surface with too many single point penetrations. Traditional approach requires line of sight to be able to excite and interrogate the thermographic phosphor on the surface of the object. Limitations of line of sight of the wafer surface prohibits use of standard surface temperature measurement techniques such as camera and wafer surface with deposited phosphor thereon or use of infrared (IR) thermal imaging camera directly.

SUMMARY

In one aspect, a fiber optic temperature measuring system for measuring a temperature of a surface at multiple points simultaneously in real time is provided. The system comprises a fiber optic probe with a fiber bundle that ahs a distal end and a proximal end and which comprises a plurality of individual fibers, a light source operatively coupled to the fiber bundle to provide an excitation light to a tip of each of the plurality of individual fibers and a thermographic phosphor coupled to the plurality of individual fibers to provide temperature measurements from multiple individual regions of the surface. Each of the individual fibers transmit the excitation light to the thermographic phosphor at a predetermined point on the individual region and a light emitted from such thermographic phosphor back to the proximal end of the fiber bundle. A high-speed camera is operatively coupled to the proximal end of the fiber bundle to detect the emitted light transmitted from each of the individual fibers. The high-speed camera is out of the line of sight with the measuring surface and comprises a plurality of pixels. A microscope objective that is operatively coupled to the light source and the high-speed camera provides an image of the distal end of the fiber bundle when the excitation light is transmitted through the fiber bundle so that the individual fibers correspond to a specific mapped position on the surface. Image of each individual fiber has a designated region of pixels on the high-speed camera. The high-speed camera receives emitted light from the individual points or regions and provides integrated signal values for a predetermined duration of an integration window and based on a light intensity of obtained images for the integration window a decay time of the emitted light from each individual point or region is calculated and a temperature measurement of such point or region is obtained.

In another aspect, a fiber optic temperature measuring system for measuring a temperature of a surface at multiple points simultaneously in real time is provided. The system comprises a fiber probe that includes a first fiber bundle with a first distal end, a first proximal end and a first plurality of individual fibers and a second fiber bundle that has a second distal end, a second proximal end and a second plurality of individual fibers. A light source is operatively coupled to the first proximal end of the first fiber bundle to provide an excitation light to the first distal end to be transmitted to a tip of each of the first plurality of individual fibers, the first of the plurality of individual fibers in the first fiber bundle configured to transmit the excitation light to the thermographic phosphor at a predetermined point on the surface. An active material, such as a thermographic phosphor is coupled to the second distal end and the second of the plurality of individual fibers to provide temperature measurements from multiple individual regions on the surface such that each of the second of plurality of the individual fibers is configured to capture and transmit a light emitted from the thermographic phosphor back to the second proximal end of the second fiber bundle. A high-speed camera is operatively coupled to the second proximal end of the second fiber bundle to detect the emitted light transmitted from each of the individual fibers, and the high-speed camera is being out of the line of sight with the measuring surface. The high-speed camera comprises a plurality of pixels where each individual fiber or group of fibers in the second fiber bundle is associated to a predetermined pixel, so that the individual fibers correspond to a specific mapped position on the surface. The high-speed camera receives emitted light from the individual points or regions and provides integrated signal values for a predetermined duration of an integration window and based on a light intensity of obtained images for the integration window a decay time of the emitted light from each individual point or region is calculated and a temperature measurement of such point or region is obtained.

In one aspect, a method for measuring a temperature of a surface at multiple points simultaneously in real time is provided. The method comprises providing an excitation light to a proximal end of a fiber bundle comprising a plurality of individual fibers; transmitting the excitation light to a thermographic phosphor coupled to a distal end of each of the individual fibers at multiple individual regions of the surface; mapping the position of the individual fibers on the surface to corresponding pixels in a camera imaging element; transmitting light emitted from the thermographic phosphor back to the proximal end of the fiber bundle; detecting the emitted light transmitted from each of the individual fibers with a high-speed camera, the high-speed camera being out of the line of sight with the measuring surface; designating a region to pixels on the high-speed camera imaging element for images detected from each individual fiber to correspond to the mapped position on the surface; measuring intensity of light detected by each region of pixels corresponding to predetermined position on the surface and providing integrated signal values for a predetermined duration of an integration window and calculating a temperature for each position on the surface based on a decay time of emitted light intensity imaged at each region of pixels of the high-speed camera.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

The present invention discloses a multipoint temperature measurement system utilizing a fiber bundle embedded with thermographic phosphor in conjunction with a high-speed camera. Invention allows for accurate multipoint measurement of ESC' surface temperature. The thermographic phosphor is embedded in a nudge at the tip of each individual fibers or on the surface (under the surface) at predetermined positions.

Figure 1:
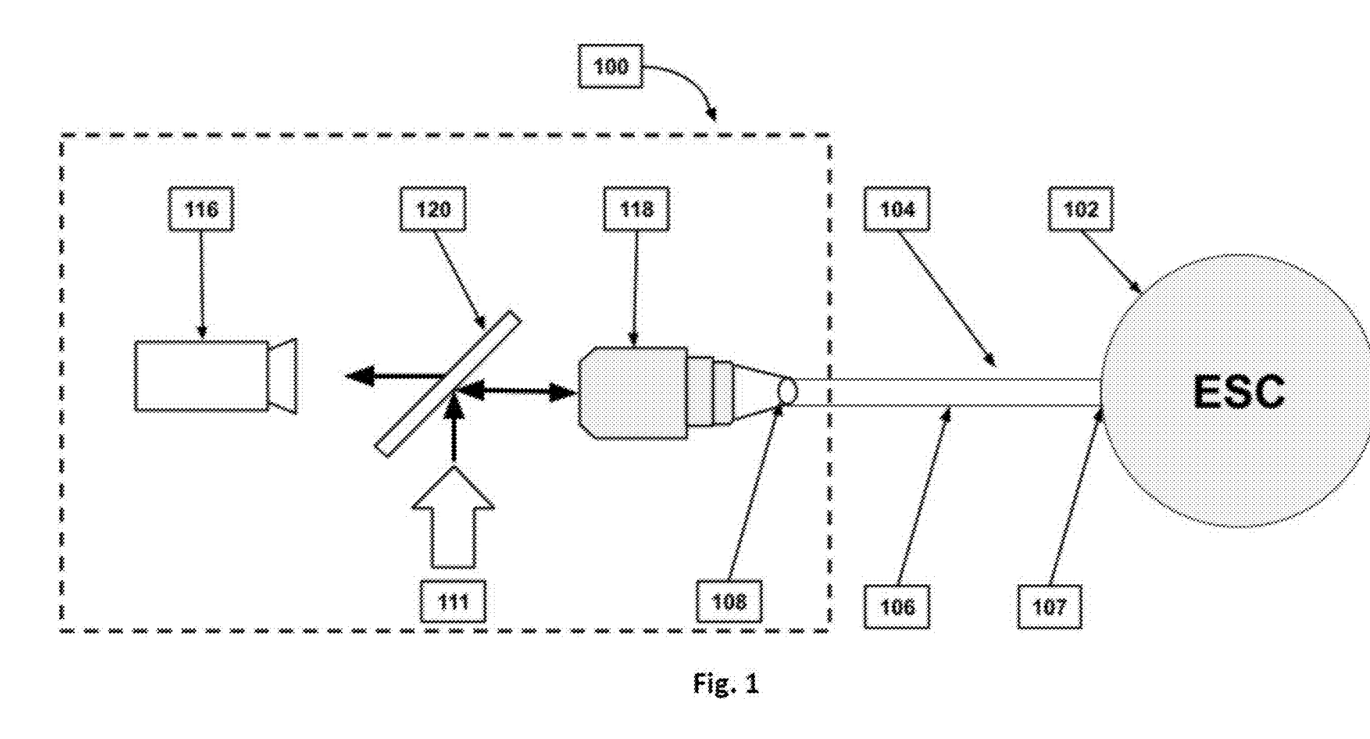
FIG. 1 is a schematic view of an example of a multi-point temperature measuring system of the present invention using a fiberoptic bundle and a high-speed camera.

FIG. 1 illustrates an example a multipoint temperature measurement system 100 for measuring a temperature at multiple points at a surface 102 simultaneously in situ in real time. For example, the surface 102 can be electrostatic chuck (ESC) surface used in the semiconductor processing chamber. The system 100 comprises a fiber optic probe 104 that has fiber bundle 106 with a 5 distal end 107 and a proximal end 108. The fiber bundle 106 can comprise a plurality of individual fibers 110 (see FIG. 2). The proximal end 108 of the fiber bundle 106 is operatively coupled to a light source 111 that provides the excitation light into the fiber bundle 106. The excitation light is guided to the active material, such as a thermographic phosphor 112 that is adjacent to the surface 102 at multiple points 102$n$. For example, each of the individual fibers 110 transmit the excitation light to the thermographic phosphor 112 at a predetermined point and then a light emitted from such thermographic phosphor 112 is received at the distal end 107 and transmitted back to the proximal end 108 of the fiber bundle 106. In the illustrated example of FIG. 2, the thermographic phosphor 112 is positioned in a notch formed on a tip 114 of the individual fibers 110. The individual fibers 110 can be bundled into a single fiber bundle 106, such as for example, 100-400 individual fibers with diameter of about ~50-100 um can be positioned below the embedded active material 112. The diameter of the fiber bundle 106 can be in the range of 1 to 3 mm and the fiber bundle 106 can be terminated by polishing an end surface.

A light source 111 is operatively coupled to the fiber bundle 106 to provide the excitation light to the thermographic phosphor 112. The light source 111 can provide excitation light in the UV waveband. For example, the light source 111 can provide an excitation light with a wavelength between 200-400 nm. In one embodiment, the light source 111 can provide an excitation light in the blue to green wavelength range (e.g. 400-600 nm). The light source can be a laser or a LED.

Figure 2:
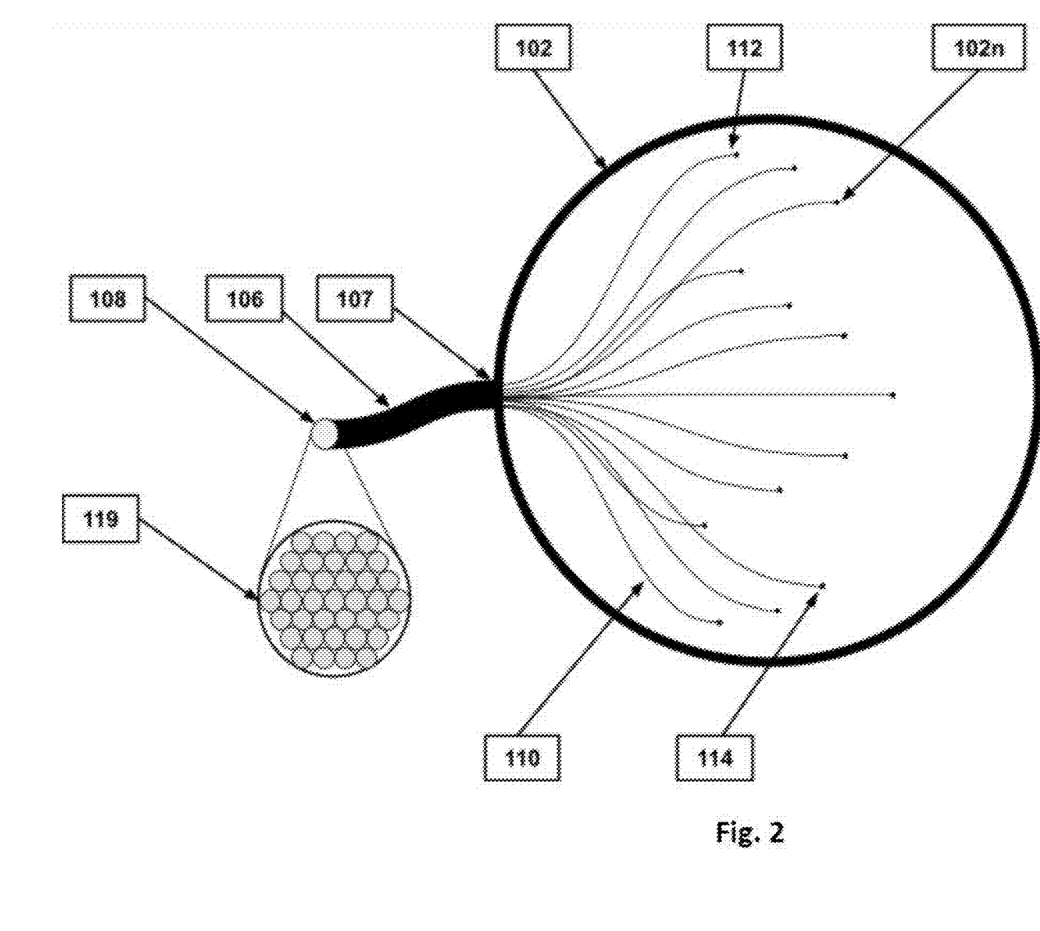
FIG. 2 is a schematic view of an example of a fiberoptic bundle showing multiple fibers in the bundle with embedded thermographic phosphor at each fiber's tip.

The thermographic phosphor 112 can be embedded at points of interest 102$n$ throughout the ESC surface 102, either underneath the surface 102 or at the tip 114 of the fibers 110 to achieve evenly distribution and temperature measurements from multiple points 102$n$ in real time simultaneously.

Figure 3:
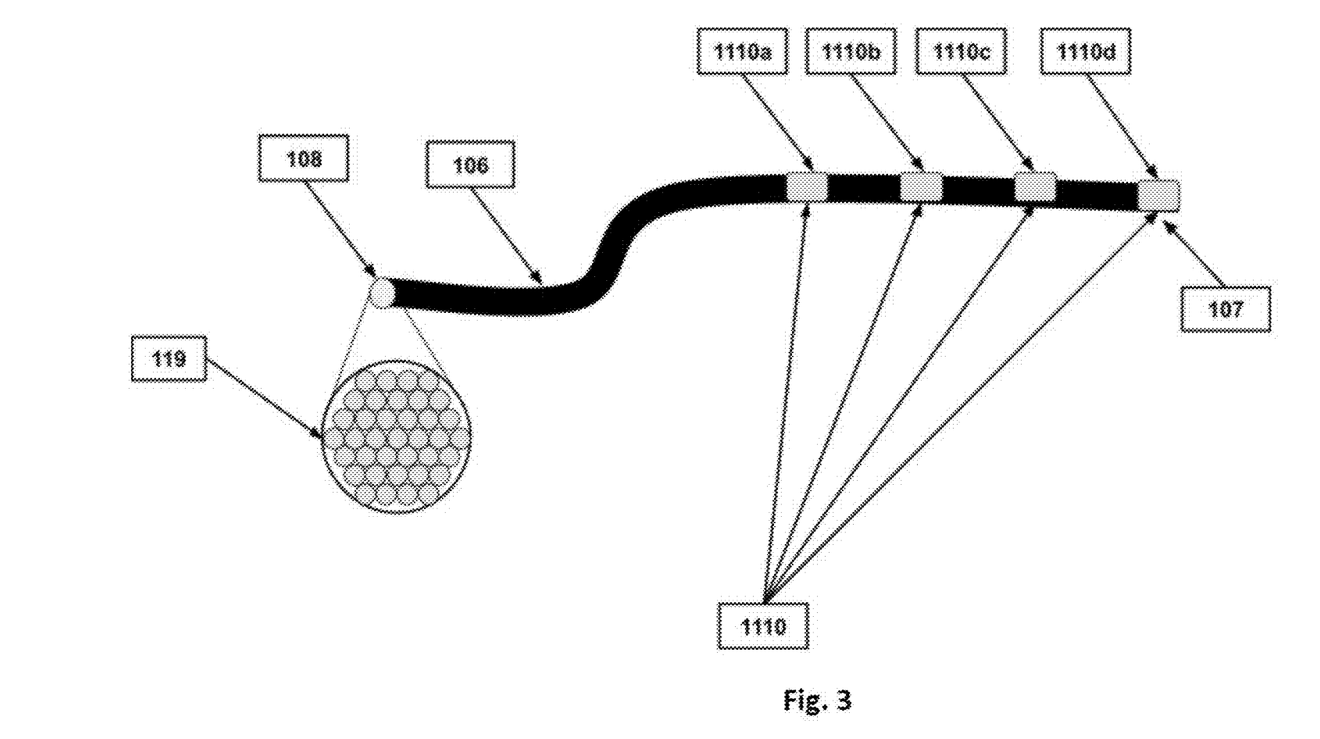
FIG. 3 is a schematic view of another example of a multi-point temperature measuring system for measuring temperature at multiple regions of a surface along a linear path of a fiberoptic bundle.

In one implementation, the individual fibers 110 can be grouped in groups 1110 as illustrated in FIG. 3. Each fiber group 1110 can have for examples approximately 10 or so fibers 110. For example, the total number of fibers 110 in the bundle 106 can be 400 which can be grouped in 40 groups 1110 of 10 fibers per group so that each group can provide temperature measurements at 40 positions (regions) on the ESC surface 102. The fiber groups 1110 can be at different positions along the length of the fiber bundle 110, such that the individual fibers 110 in each of the fiber group 1110 can terminate at different position along the length of the bundle 106. For example, a first group 1110$a$ can be at 50 cm from the proximal end 108, a second group 1110$b$ can be at 60 cm, a third group 1110c 1110a can be at 70 cm from the proximal end 108. The fiber groups 1110 can be at any position along the length of the fiber bundle 106 and each group can be at any distance one from another without departing from the scope of the invention. In the illustrated example, the fourth fiber group 1110d is positioned at the distal end 107 of the fiber bundle 106. A thermographic phosphor is positioned at the tip of each of the fiber groups 1110 for measuring temperature of each individual region of the surface 102 in proximity to respective fiber group 1110.

Figure 4:
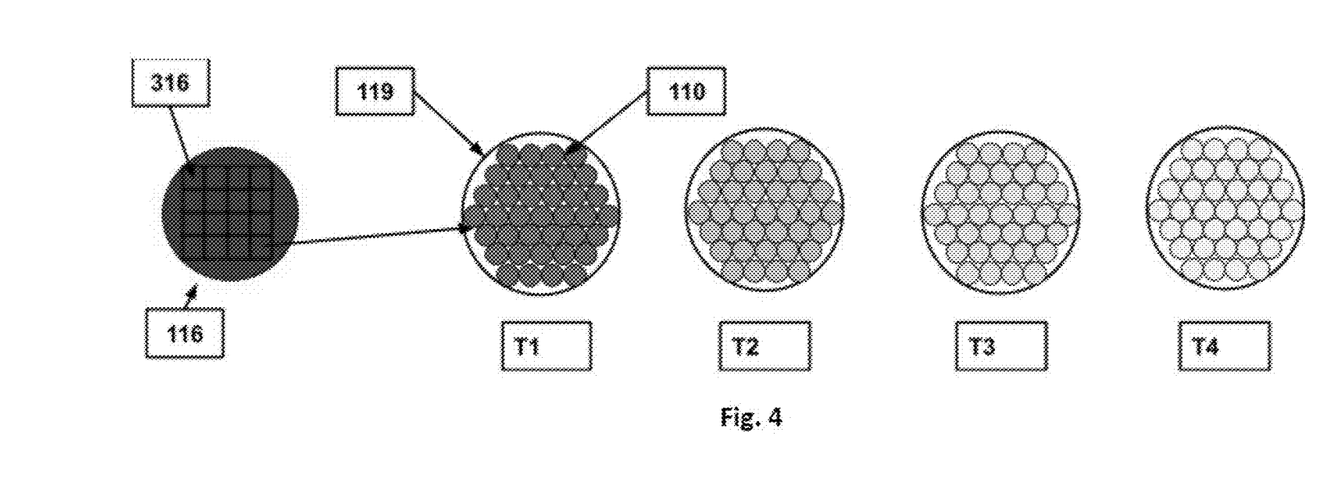
FIG. 4 is a schematic view of examples of images fiber bundle distal end viewed by a high-speed camera.

Measurement of the temperature is performed utilizing a high-speed digital camera 116. The light emitted from the thermographic phosphor 112 after exciting it with the excitation light is detected by the camera 116 that is operatively coupled to the fiber bundle 106. The high-speed camera 116 can comprise a plurality of pixels 316 (FIG. 4) and is out of the line of sight with the measuring surface 102 and the measuring points/positions 102n. This accomplishes "transposition" of the measuring parameter of interest (e.g. temperature) from the large surface 102 of interest into a small fiber bundle face 119 (closely showed in FIG. 2) effectively allowing for interrogation of large surface without need for line of sight.

A microscope objective 118 can be used to image the distal end 107 of the 5 fiber bundle 106 when the excitation light is transmitted through the fiber bundle 106 for mapping the position of the individual fibers 110 or fiber bundle groups at the surface 102. Mapping is done by imaging the face 119 (i.e., an end surface) of all fibers 110 by shining light to a first fiber 110 or group of fibers and determine positions of the fibers 110 on the face 119 and assign a region (point 102n) to such fiber/group of fibers 110 before continuing to the next group of fibers 110 until all fibers 110 in the bundle 106 are mapped. The end face 119 of the fiber bundle 110 is at the proximal end 108 of the bundle, such as it is a polished end surface of the fiber bundle at the proximal end 108. The face 119 is at some predetermined distance from the objective lens depending on the focal length. For example, the face 119 can be 5 mm-15 mm away of the objective lens. The image of each individual fiber 110 has a designated region of pixels 316 on the high-speed camera 116. FIG. 3 schematically show image of the face 119 of the individual fibers 110 corresponding to specific mapped points 102n on the ESC surface 102 at four time of exposure T1-T4, which can be in the range of 0.5-5 ms, depending on the active material used. Image of a single fiber 110 has a designated region of pixels of the camera 116. Group of designated pixels corresponds to single point 102n on the surface 102 and is used for the specific point temperature measurements. Thus, single measurement point positions 102n are mapped to the specific regions of the fiber bundle face 119.

The light emitted from the thermographic phosphor 112 is in a wavelength different from the excitation light. For example, the emitted light can be in the red wavelength range, such as for example, 600-800 nm. Since the fiber bundle 106 transmits both the excitation light and the emitted light, an optical splitter 120 can be provided to separate the excitation light from the emitted light. For example, the optical splitter 120 can be a dichroic mirror.

Interrogation of the surface 102 is carried out by high speed camera 116. Light signal is imaged on camera's imaging sensor and exposure for camera is set for the predetermined duration of the integration window. For example, the exposure of the camera can be set up at 1 ms, such that the emitted light of each individual point or region is imaged by respective designated pixel 316 of the high-speed camera 116. The intensity of pixels for specific predetermined point/region is directly proportional to integrated light intensity for that region and specific integration window. By measuring intensity of, for example, four consecutive windows, the decay rate of the optical signal for a specific region can be calculated and temperature can be determined based on the decay time of the emitted light for the thermographic phosphor.

Figure 5:
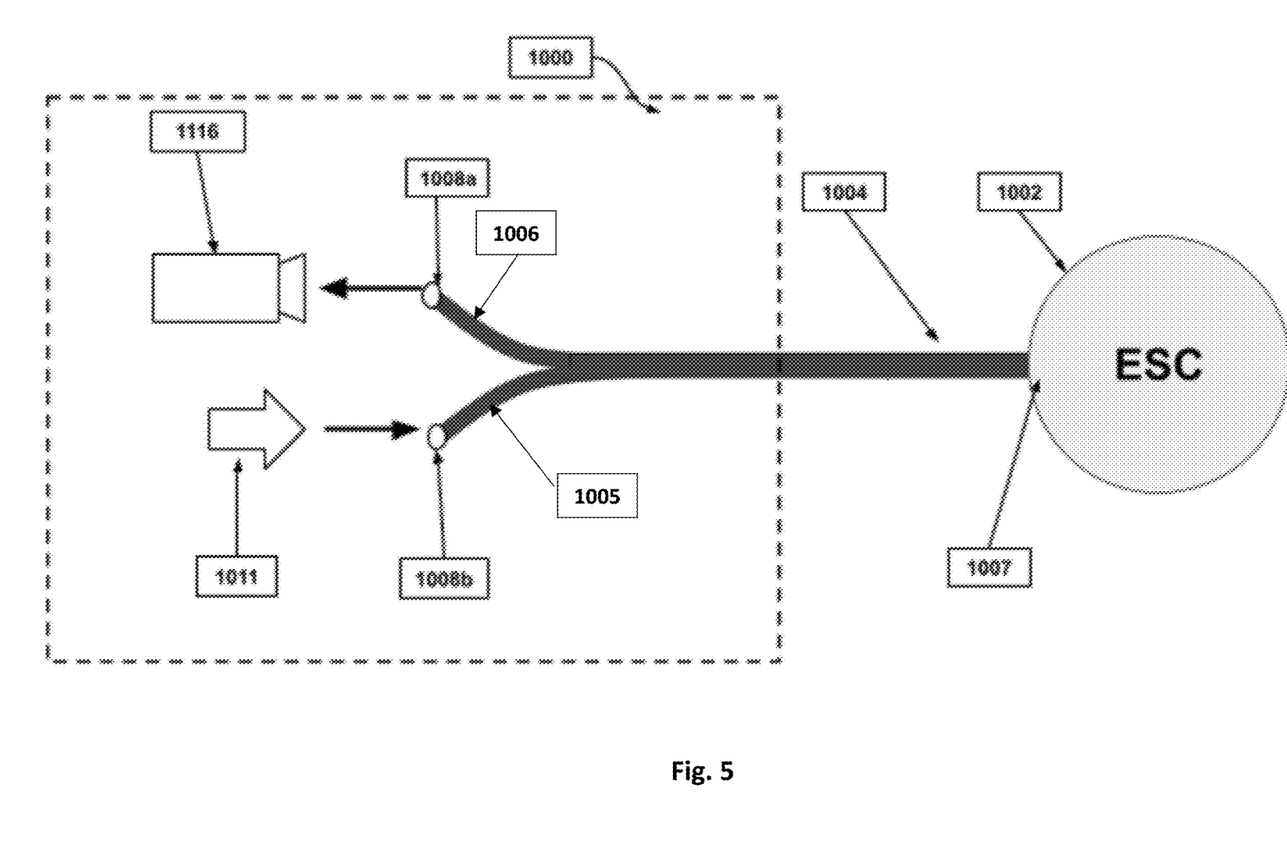
FIG. 5 is a schematic view of an example of another embodiment of a multi-point temperature measuring system of the present invention using two fiberoptic bundles and a high-speed camera.

FIG. 5 illustrates another embodiment of a multipoint temperature measurement system 1000 for measuring a temperature at multiple points at a surface 1002 simultaneously in situ in real time. The system 1000 comprises a fiber optic probe 1004 with a distal end 1007. The probe 1004 has a first fiber bundle 1005 and a second fiber bundle 1006. Each of the fiber bundles 1005 and 1006 can comprise a plurality of individual fibers (similar to fibers 110 of FIG. 2). A proximal end 1008b of the first fiber bundle 1005 is operatively coupled to a light source 1011 that provides the excitation light into the fiber bundle 1005. The light source 1011 can be the same or similar to the light source 111 of FIG. 1. The excitation light is guided to the active material, such as a thermographic phosphor that is adjacent to the surface 1002 at multiple points or to a distal end 1007 of the probe 1004. Coupling optics can be used to transmit the light generated by the light source 1011 into the first bundle 1005 to excite the active material coupled to the surface 1002 A light emitted from the thermographic phosphor is captured by the second fiber bundle 1006 that transmits the emitted light back to a proximal end 1008a of the second bundle 1006. The emitted light captured and transmitted by the second fiber bundle 1006 is imaged by the high-speed camera 1116.

The active material, such as the thermographic phosphor can be embedded at points of interest throughout the surface 1002, either underneath the surface 1002 or at the tip of the probe 1004 (coupled to the first and the second distal ends of the first and second bundles 1005, 1006) to achieve evenly distribution and temperature measurements from multiple points in real time simultaneously. When the active material is coupled at the tip of the probe 1004, the active material such as the thermographic phosphor needs to be semitransparent material so that the light emitted by the active material can be captured by the fibers in the second fiber bundle 1006.

In one implementation, the individual fibers of the first and second bundles 1005, 1006 can be grouped in groups similar to the groups 1110 illustrated in FIG. 3. For example, if each fiber group 1110 has 10 fibers, 5 of those 10 fibers can be bundled to form the first (illumination) fiber bundle 1005 while the other 5 fibers will be bundled to form the second fiber bundle 1006. For example, the total number of fibers in the first bundle 1005 can be 200 fibers that transmit excitation lights to 40 measuring positions (regions) on the ESC surface 1002 and the total number of fibers in the second bundle 1006 can be 200 fibers to capture the emitted light from such 40 measuring positions (regions) and thus provide temperature measurements at the 40 positions (regions) on the ESC surface 102 simultaneously in real time. The fiber groups can be at different positions along the length of the fiber probe 1004, such that the individual fibers in each of the first and second fiber bundles 1005n, 1006n of each of the fiber group can terminate at different position along the length of the probe 1004 as was described previously with respect to the system of FIG. 3.

The high-speed camera 1116 can comprise a camera sensing material such as CCD chip with a plurality of pixels (see pixels 316 of FIG. 4) and is out of the line of sight with the measuring surface 1002 and the measuring points/ positions. In one embodiment, the proximal end 1008a of the second fiber bundle 1006 can be directly bundled to the CCD chip. For example, the individual fibers or group of fibers that are transmitting emitted light from a predetermined measuring region can be coupled to a predetermined pixel 316 in the CCD thus providing the accurate fiber mapping assigned to a certain measuring region. In one embodiment a microscope objective, similar to the microscope objective 118 of FIG. 1, can be used to map the position of the individual fibers or fiber bundle groups assign a certain measuring position/region on the surface 1002. The light signal is imaged on camera's imaging sensor and exposure for camera is set for the predetermined duration of the integration window. For example, the exposure of the camera can be set up at 1 ms, such that the emitted light of each individual point or region is imaged by respective designated pixel 316 of the high-speed camera 1116. The intensity of pixels for specific predetermined point/region is directly proportional to integrated light intensity for that region and specific integration window. By measuring intensity of, for example, four consecutive windows, the decay rate of the optical signal for a specific region can be calculated and temperature can be determined based on the decay time of the emitted light for the thermographic phosphor.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. A fiber optic temperature measuring system for measuring a temperature of a surface at multiple points simultaneously in real time comprising:
   a fiber optic probe comprising:
      a first fiber bundle having a first distal end, a first proximal end and a first plurality of individual fibers; and
      a second fiber bundle having a second distal end, a second proximal end and a second plurality of individual fibers;
   a light source operatively coupled to the first proximal end of the first fiber bundle to provide an excitation light to the first distal end and transmit the excitation light to a tip of each of the first plurality of individual fibers, the first of the plurality of individual fibers in the first fiber bundle configured to transmit the excitation light to a predetermined point on the surface;
   a thermographic phosphor coupled to the second distal end of the second of the plurality of individual fibers to provide temperature measurements from multiple individual regions at each predetermined point on the surface, each of the second of plurality of the individual fibers configured to capture and transmit a light emitted from the thermographic phosphor back to the second proximal end of the second fiber bundle;
   a high-speed camera operatively coupled to the second proximal end of the second fiber bundle to detect the emitted light transmitted from each of the individual fibers, the high-speed camera being out of the line of sight with the measuring surface and comprising an image sensor with a plurality of pixels, each individual fiber or group of fibers in the second fiber bundle transmitting emitted light from a predetermined measuring region being coupled to a predetermined pixel on the sensor; and
   a microscope objective operatively coupled to the light source and the high-speed camera to provide an image of the distal end of each individual fiber or group of fibers of the second fiber bundle when the excitation light is transmitted through the first fiber bundle, the microscope objective mapping a position of the second plurality of individual fibers assigned to the predetermined measuring region on the measuring surface, wherein image of each second individual fiber or group of fibers having predetermined pixels on the image sensor of the high-speed camera, wherein the high-speed camera receives emitted light from the measuring points or regions and provides integrated signal values for a predetermined duration of an integration window and based on a light intensity of obtained images for the integration window a decay time of the emitted light from each measuring point or region is calculated and a temperature measurement of such point or region is obtained.

2. The fiber optic temperature measuring system of claim 1, wherein the thermographic phosphor is coupled to the first and the second ends of the corresponding first and second fiber bundles, the thermographic phosphor being a semi-transparent material.

3. The fiber optic temperature measuring system of claim 1, wherein the thermographic phosphor is embedded into the measuring surface at predetermined multiple positions.

4. The fiber optic temperature measuring system of claim 1, wherein the first plurality of individual fibers and the second plurality of individual fibers from the first and the second fiber bundles are grouped into a number of groups positioned at predetermined position along a length of the fiber probe, each group comprising two or more individual fibers, each group of fibers providing temperature measurement from a predetermined measuring region on the surface.

5. The fiber optic temperature measuring system of claim 1, wherein the first fiber bundle comprises a polished end surface at the proximal end and the second fiber bundle comprises a polished end surface at the proximal end.

* * * * *